United States Patent

Hermensson

[11] Patent Number: 5,725,011
[45] Date of Patent: Mar. 10, 1998

[54] APPARATUS FOR DRAINAGE OF OIL AND WATER FROM A SURFACE, ESPECIALLY FROM THE DECK OF A TANKER

[76] Inventor: Hans Hermensson, Odine vai 79, N-3472 Bodalen, Norway

[21] Appl. No.: 500,927

[22] PCT Filed: Feb. 3, 1994

[86] PCT No.: PCT/NO94/00030

§ 371 Date: Aug. 7, 1995

§ 102(e) Date: Aug. 7, 1995

[87] PCT Pub. No.: WO94/17890

PCT Pub. Date: Aug. 18, 1994

[30] Foreign Application Priority Data

Feb. 8, 1993 [NO] Norway ................................. 930434

[51] Int. Cl.$^6$ ................................................. B01D 17/032
[52] U.S. Cl. ........................... 137/172; 137/899.2; 210/536
[58] Field of Search .............................. 137/172, 899.2; 210/536, 540

[56] References Cited

U.S. PATENT DOCUMENTS

| | | |
|---|---|---|
| 405,047 | 6/1889 | Newsome ........................... 210/536 |
| 616,661 | 12/1898 | Glenn ................................. 210/537 |
| 1,627,569 | 5/1927 | Massicks ........................... 210/537 |

FOREIGN PATENT DOCUMENTS

| | | |
|---|---|---|
| 5438/89 | 11/1989 | Denmark. |
| 0442 192 | 8/1991 | European Pat. Off.. |
| 841868 | 7/1960 | United Kingdom ............... 137/172 |

*Primary Examiner*—Gerald A. Michalsky
*Attorney, Agent, or Firm*—Clifford W. Browning; Woodard, Emhardt, Naughton Moriarty & McNett

[57] ABSTRACT

An apparatus for separate drainage of two non-miscible liquids, especially oil and water, from a surface, especially from the deck (4) of a tanker (1). The apparatus comprises an upwardly open, well-forming container (11) which, in use, is installed with its upper edge essentially flush with said surface (4), and which is provided in its upper portion with a first (13) and a second (14) outlet means, the first outlet means (13) being located at a lower level than the second one (14). In the container (11) there is provided an inner tube (15) having a lower open end at the bottom (12) of the container (11), and an upper end which is carried in a sealing manner through the wall of the container (11) and is connected to the first outlet means (13).

6 Claims, 3 Drawing Sheets

APPARATUS FOR DRAINAGE OF OIL AND WATER FROM A SURFACE, ESPECIALLY FROM THE DECK OF A TANKER

The invention relates to an apparatus for drainage of liquids, especially two non-miscible liquids having different specific gravities, such as water and oil, from a surface, especially from the deck of a tanker.

BACKGROUND OF THE INVENTION

When a tanker handles oil, it generally always lies with so-called aft trim, i.e. with a larger draft aft than before. Moreover, such vessels are constructed with a deck curvature, i.e. the deck curves upwards towards the centre line and then downwards towards the ship's side at both sides. This entails that rainwater and waste water on the deck flow aftwards and towards the sides. In addition, tankers at both sides in the longitudinal direction have a vertical flat iron strip which is welded to the deck. This strip is about 150 mm high along its entire length and is to protect against oil flowing overboard. In order to be able to keep the deck free of water in other cases than in cargo handling, each strip along its entire length has a plurality of drainage holes, so-called scuppers.

In cargo handling it is a requirement that the scuppers are closed. Since a liquid in aft trim flows aftwards and outwards towards the sides, said strip in this situation has a very modest function. The liquid is collected in a wedge-shaped pond at both sides at the rear edge of the deck where the flow is stopped by the rear superstructure of the vessel. With a continuous flow, the liquid level rises to the upper edge of the strip furthest aftwards, and the liquid flows overboard. If water is standing at the rear edge of the deck when an oil spill on the deck occurs, oil flows on top of the water and overboard. The deck therefore, for example in rainy weather, must be drained continuously by opening the rearmost scupper. If an oil spill then should occur, oil flows overboard throught the scupper. If the deck is dry in case of an oil spill, one has problems in getting the oil away before it rises above the strip and flows overboard.

It occurs that one has prepared small pneumatically driven pumps which are to drain the oil spill to a suitable tank on the vessel. In most cases, however, the preparedness is limited to some empty lubricating oil drums, shovels and saw dust. This is very often insufficient in case of larger oil spills.

SUMMARY OF THE INVENTION

Thus, the object of the invention is to provide an apparatus which eliminates the above-mentioned problems, and which in a simple but efficient manner provides for separate drainage of oil and water from a surface, and especially from the deck of a tanker.

The above object is achieved with an apparatus of the introductorily stated type, which, according to the invention, is characterized in that it comprises an upwardly open, well-forming container which, in use, is installed with its upper edge essentially flush with said surface, and which is provided in its upper portion with a first and a second outlet means, the first outlet means being at a lower level than the second one, and a tube arranged in the container, which tube has a lower open end at a level at the bottom of the container, and an upper end which is carried in a sealing manner through the wall of the container and is connected to the first outlet means.

The apparatus according to the invention is based on the principle of communicating vessels. As known, with a pair of communicating vessels which contain the same liquid, e.g. water, there is achieved a balance at exactly the same levels in both vessels. If oil is filled on top of the water in one vessel, a balance is achieved at a higher level in this vessel, since oil is always lighter than water. Thus, a balance in weight between the liquid columns in the two vessels is achieved at a more or less higher level in the vessel containing oil.

As stated above, the upwardly open, well-forming container in the apparatus according to the invention has an inner tube the upper end of which is connected to the lower outlet means of the container, which means forms an outlet towards the seaward side when the apparatus is installed on a vessel. The inner tube is filled with water, and the lower edge of the outlet serves as a level control of the water column in this tube. The upper outlet means of the container forms an outlet for oil which, during operation, floats on the water in the container, the lower edge of this outlet being placed higher than the outlet means of the inner tube. The vertical distance between the lower edges of the oil outlet and the water outlet is dependent on the depth of the container and the specific gravity of the oil handled in the case in question.

In an advantageous embodiment of the apparatus, the first outlet means comprises an outlet tube which is provided with a shut-off valve. Preferably, this valve may be a gate valve having a damper which is arranged to close from below and upwards, so that the upper edge of the damper determines the outlet level of the valve. By means of such a valve, the apparatus may be adjusted for different specific gravities of the oil.

BRIEF DESCRIPTION OF THE DRAWING FIGURES

The invention will be further described below in connection with an exemplary embodiment with reference to the drawings, wherein FIG. 1 shows a schematic plan view of a vessel which is provided with two apparatuses according to the invention;

DETAILED DESCRIPTION OF THE PREFERRED EMBODIMENTS

The apparatus according to the invention in principle may be used for separate drainage of two arbitrary, non-miscible liquids having different specific gravities. Primarily, however, it is intended for drainage of water and oil spill from the deck of a tanker, and will be described in this connection below.

Figure 1:
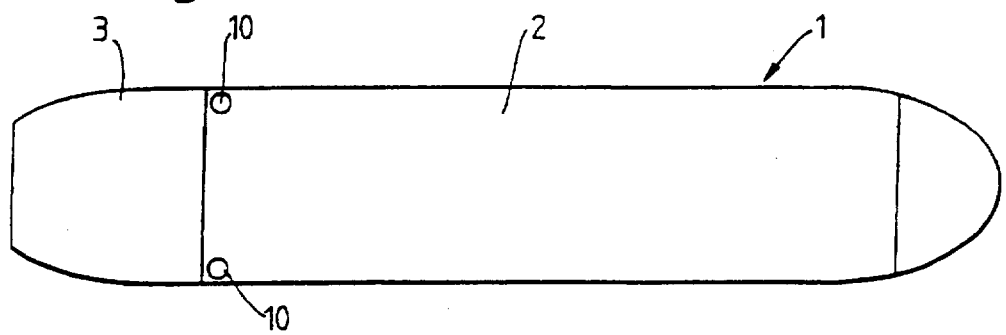
Figure 2:
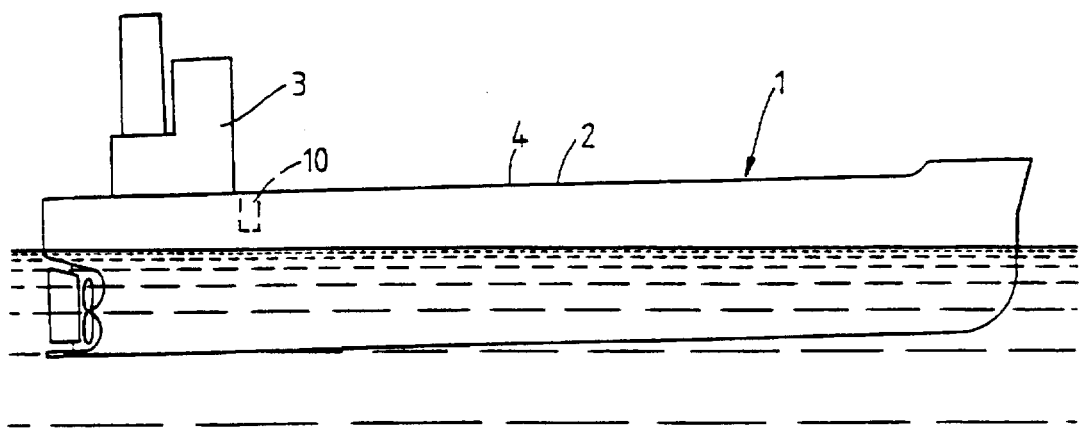
FIG. 2 shows a side view of the vessel in FIG. 1.
Figure 3:
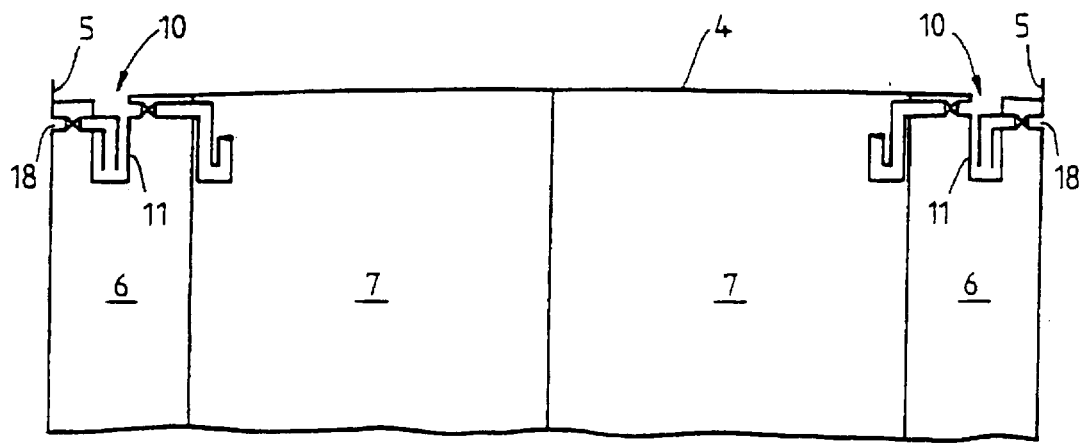
FIG. 3 shows a schematic incomplete cross-sectional view of a vessel having two apparatuses according to the invention.

FIGS. 1 and 2 show a tanker 1 which is equipped with two apparatuses 10 according to the invention. The vessel has a forward loading area 2 and a rearward superstructure 3, and the apparatuses 10 are installed at the outermost rear edge of the loading area at both sides of the vessel. As appears from FIG. 2, during cargo handling the vessel has a larger draft aft than before (aft trim), and further it has a deck curvature as shown in FIG. 3, so that liquid on the deck 4 flows aftwards and is collected in the areas where the apparatuses 10 are installed. The introductorily mentioned flat iron strip, which is arranged along each vessel side and which is to prevent oil from flowing overboard, is designated by the numeral 5 in FIG. 3.

In the cross-sectional view in FIG. 3, the two apparatuses 10 are shown to be installed in the upper region of respective ballast tanks 6 and to guide oil to respective slop tanks 7.

An embodiment of an apparatus according to the invention will be further described with reference to FIG. 4. The apparatus 10 comprises a container 11 in the form of a suitably dimensioned steel tube (diameter D) which is open at the top and closed at the bottom 12, e.g. with a steel plate. In use, the tube is installed (welded) with its upper edge flush with the deck 4 as shown in FIG. 3, so that it forms a well which suitably may be designated "scupperwell". In its upper portion the tube 11 is provided with a first outlet means 13 at a height $H_1$ above the bottom 12, and a second outlet means 14 at a height $H_2$ above the bottom, where $H_1<H_2$, so that there is a suitable level difference between the outlet mean. Within the tube 11, there is arranged an inner tube 15 having a lower open end at a suitable height above the bottom 12, and an upper end which is carried in a sealing manner through the wall of the tube 11 and is connected to the first outlet means 13. This means consists of an outlet tube 16 which, via a schematically shown shut-off valve 17, leads to an opening 18 in the ship's side, as shown in FIG. 3.

The second outlet means 14 consists of an outlet tube 19 which, via a schematically shown shut-off valve 20, is connected to a suitable oil collecting tank (the slop tank 7) via a liquid trap 21. The outlet tube 19 is welded to a suitable hole in the wall of the out tube 11, and it projects a distance into the tube 11 and is obliquely cut, with the longest part of the tube end 22 located uppermost, as shown with dashed lines in FIG. 4. This protects against a water flow from the deck of the vessel flowing into the outlet. As an alternative, there may be arranged a suitable lip projecting outside the end of the tube 19 at the upper side and the sides thereof, and which slants suitably downwards, to cover and protect the outlet against ingress of water.

Figure 4:
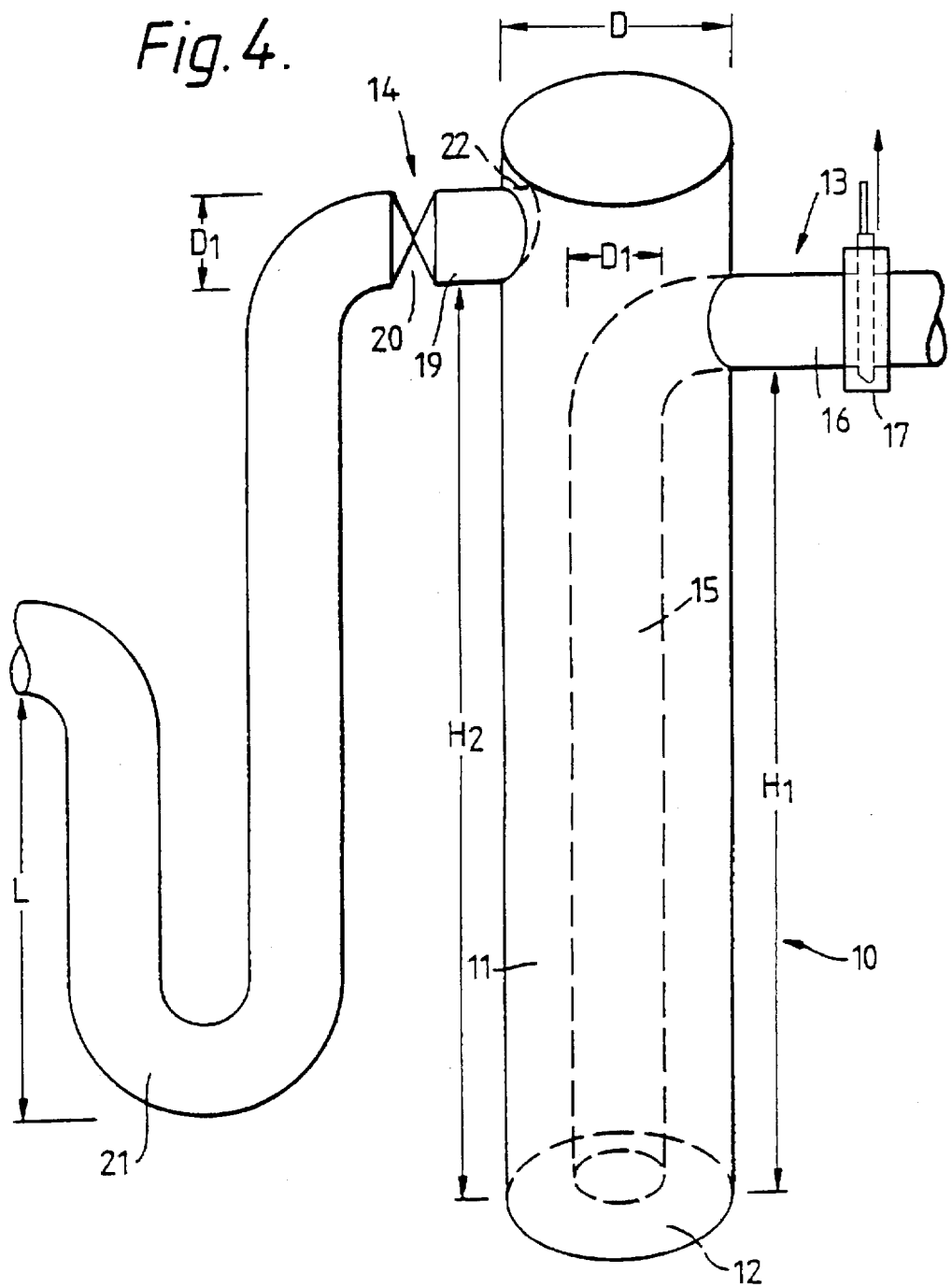
FIG. 4 shows a side view of an apparatus according to the invention.

The inner tube 15 and the oil outlet tube 19 in FIG. 4 are shown to have the same diameter $D_1$. However, they do not need to have the same diameter.

The upper opening of the well-forming container 11 in practice expediently will be covered by a protecting grating (not shown). In addition, it may be covered by a lid when it is not in use. At the lower end of the container there is advantageously provided an opening for cleaning purposes or the like, which opening may be covered by a suitable shutter, for example of 15×15 cm, which may be bolted to the container wall.

Figure 5:
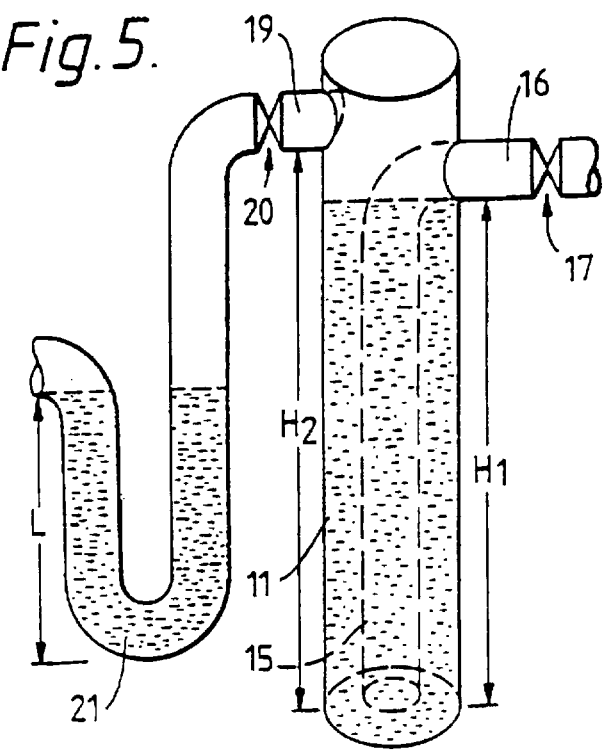
FIGS. 5 and 6 show side views corresponding to that of FIG. 4, on a reduced scale, for explanation of the manner of operation of the apparatus.
Figure 6:
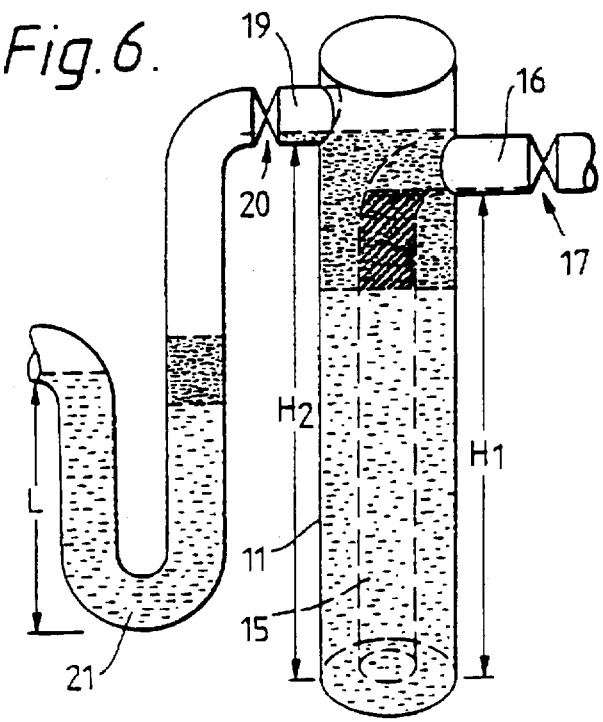

In order to elucidate further the function of the apparatus, reference is made to FIGS. 5 and 6. FIG. 5 shows the starting condition before use. The apparatus, i.e. the container 11 and the inner tube 15, here is filled with water up to the level $H_1$ after the valves 17 and 20 have been opened, and also the liquid trap 21 is filled with water (or oil). With additional filling of water (rain) the level rises somewhat, but the water continuously flows out through the water outlet tube 16, so that there is a balance or equilibrium in the system.

If oil is filled into the outer tube 11, a corresponding water column weight will be drained away through the water outlet tube 16 via the inner tube 15. The lighter the oil is, the greater the height difference will be between the oil column in the outer tube and the water column in the inner tube. The essential thing is that the oil is "captured". With additional supply of oil, there finally occurs a balance between the outer and the inner tube when the oil has risen to the level $H_2$, i.e. to the lower edge of the oil outlet tube 19. With additional oil supply, some water is pressed out through the outlet tube 16 at the same time as the oil level in the tube 11 rises and oil flows out through the outlet tube 19. Simultaneously, a corresponding volume of water in the liquid trap 21 is replaced by oil. This situation is shown in FIG. 6 wherein the water is shown with a somewhat lighter shading than the oil, and the water column in the inner tube 15 above the bottom of the oil column in addition is shown to be hatched.

In case of a possible oil spill on the vessel, it is presupposed that this is discovered by the crew, and that the water outlet valve 17 then, for the sake of safety, is closed. The oil then is drained directly to the oil collecting tank.

After use of the apparatus, the container 11 is emptied by means of a suitable pump.

Important parameters in the construction of the apparatus are the heights $H_1$ and $H_2$, and the length L of the liquid trap column. As an example, it may be presupposed that the height $H_2$ is one half water and one half oil when the oil starts flowing out through the outlet. With a specific gravity of 0.8 of the oil (e.g. diesel oil), one has then:

$$H_1 \times 1,0 = H_2/2 \times 1,0 + H_2/2 \times 0,8$$

i.e. $H_1 = 0,9 H_2$

If a structure with $H_2=2,5$ m is chosen, then $H_1=2.25$ m. The structure then is dimensioned for water having a specific gravity of 1,0 and oil having a specific gravity of 0,8.

In order not to change the ratio between oil and water column over the height $H_2$ even if the specific gravity of the oil varies, the water outlet valve 17 may be used to adjust the height difference between $H_1$ and $H_2$, i.e. an adjustment for oils having a higher specific gravity than 0,8. For achieving this purpose, the valve advantageously may be a gate valve having square damper which is arranged to close from below and upwards, so that the upper edge of the damper determines the outlet level of the valve. The valve may be of a known and commercially available type, and more specifically a spindle-operated gate valve which is installed upside down. In this manner the difference between $H_2$ and $H_1$ is reduced, which in principle means an adaptation to oils having a higher specific gravity than 0,8. In practice, the liquid trap will be dimensioned in relation to the topical pressures which may occur in the oil collecting tank. In this connection it is advantageous that the valve is provided with a calibrated setting scale, for adjustment of the valve in accordance with the specific gravity difference between the water and the oil in question.

The liquid trap height L is dependent on the setting of the safety valve (P/V valve, not shown) which is used for the oil collecting tank, i.e. the settings for overpressure and underpressure. This pressure may be max. 2100 mm WC at the overpressure side and max. 700 mm WC at the underpressure side. In most cases these settings are 1400 and 350 mm WC, respectively. The quantity L then becomes approx. 700+175=875 mm, and the total height at the outlet side becomes at least the double. For oil there is divided by 0,8.

The apparatus or device according to the invention advantageously may be built as a unit or module, ready for installation at the topical place of use. Alternatively, it may be built in situ, i.e. constructed from individual parts at the place of use, e.g. on a tanker. If it is desirable in order to increase the capacity of the apparatus, the well-forming container may be provided with several first and several second outlet means, each of the first outlet means being connected to an associated inner tube in the container.

I claim:

1. An apparatus for drainage of two non-miscible liquids of different specific gravities from an essentially horizontal surface, comprising a well-forming container having a bottom portion, a sidewall, and an upper opening defined by the upper edge of said sidewall, said upper edge to be essentially flush with the horizontal surface when said container is in use;

said container being further provided with first and second outlet means in an upper portion of said sidewall, the first outlet means being at a lower level than the second outlet means;

and a tube disposed within said container, said tube having a lower open end positioned adjacent said bottom portion of said container and an upper open end extending in a sealing manner through said sidewall of said container and connecting to said first outlet means so as to be in fluid communication therewith, whereby when said container and said tube are in operation and are filled with two non-miscible liquids of different specific gravities, the liquid having the highest specific gravity fills said container and said tube up to the level of said first outlet means, wherein said first outlet means comprises an outlet tube that is provided with a shut-off valve, and wherein said valve in a gate valve having a damper that is arranged to close from below and upwards, so that the upper edge of the damper determines the outlet level of the valve whereby the outlet level of said valve may be controlled.

2. An apparatus according to claim 1, wherein said second outlet means comprises an outlet tube that is provided with a shut-off valve.

3. An apparatus for drainage of two non-miscible liquids of different specific gravities from an essentially horizontal surface, comprising a well-forming container having a bottom portion, a sidewall, and an upper opening defined by the upper edge of said sidewall, said upper edge to be essentially flush with the horizontal surface when said container is in use;

said container being further provided with first and second outlet means in an upper portion of said sidewall, the first outlet means being at a lower level than the second outlet means;

and a tube disposed within said container, said tube having a lower open end positioned adjacent said bottom portion of said container and an upper open end extending in a sealing manner through said sidewall of said container and connecting to said first outlet means so as to be in fluid communication therewith, whereby when said container and said tube are in operation and are filled with two non-miscible liquids of different specific gravities, the liquid having the highest specific gravity fills said container and said tube up to the level of said first outlet means, whereby said first outlet means comprises an outlet tube that is provided with a shut-off valve, and wherein said valve is a gate valve whereby the outlet level of said valve may be controlled, and wherein said second outlet means comprises an outlet tube that is provided with a shut-off valve, and wherein said outlet tube is connected to a collecting tank via a liquid trap.

4. An apparatus according to claim 3, wherein said outlet tube projects a distance into said container and is obliquely cut, with the longest part of the tube end located uppermost.

5. An apparatus for drainage of two non-miscible liquids of different specific gravities from an essentially horizontal draining surface, comprising a well-forming container having a bottom portion, a sidewall, and an upper first opening defined by the upper edge of said sidewall, said upper edge to be fitted to a second opening in said horizontal draining surface and essentially flush with said second opening;

said container being further provided with first and second outlet means in an upper portion of said sidewall, the first outlet means being at a lower level than the second outlet means;

and a tube disposed within said container, said tube having a lower open end positioned adjacent said bottom portion of said container and an upper open end extending in a sealing manner through said sidewall of said container and connecting to said first outlet means so as to be in fluid communication therewith;

said container and said tube prior to operation being filled up to said first outlet means with the liquid having the highest specific gravity, whereby when the two non-miscible liquids of different specific gravities enter the container, only the liquid having the highest specific gravity will be discharged through the first outlet means, while all the liquid having the lowest specific gravity will rise to the top of the other liquid within the container and be discharged directly through the second outlet means, wherein said second outlet means comprises an outlet tube that is provided with a shut-off valve, and wherein said outlet tube is connected to a collecting tank via a liquid trap.

6. An apparatus according to claim 5, wherein said outlet tube projects a distance into said container and is obliquely cut, with the longest part of the tube end located uppermost.

* * * * *